United States Patent [19]
Goutzoulis

[11] Patent Number: 5,103,495
[45] Date of Patent: Apr. 7, 1992

[54] PARTITIONED OPTICAL DELAY LINE ARCHITECTURE FOR TIME STEERING OF LARGE 1-D ARRAY ANTENNAS

[75] Inventor: Anastasios P. Goutzoulis, Pittsburgh, Pa.

[73] Assignee: The United States of America as represented by the Secretary of the Air. Force, Washington, D.C.

[21] Appl. No.: 685,350

[22] Filed: Apr. 11, 1991

[51] Int. Cl.$^5$ ............................................. G02B 6/26
[52] U.S. Cl. .................................... 385/15; 385/147; 342/375; 359/140; 359/173
[58] Field of Search .............................. 342/375, 374; 250/227.12; 350/96.10, 96.15, 96.16, 96.24; 455/610, 612, 613, 608; 370/1-4

[56] References Cited

U.S. PATENT DOCUMENTS

| | | | |
|---|---|---|---|
| 3,368,202 | 2/1968 | Crousel | 340/172.5 |
| 4,671,604 | 6/1987 | Soref | 350/96.15 |
| 4,671,605 | 6/1987 | Soref | 350/96.15 |
| 4,714,314 | 12/1987 | Yang et al. | 350/96.20 |
| 4,725,844 | 2/1988 | Goodwin et al. | 342/374 |
| 4,814,773 | 3/1989 | Wechsberg et al. | 342/368 |
| 4,814,774 | 3/1989 | Herczfeld | 342/372 |
| 4,832,433 | 5/1989 | de La Chapelle et al. | 350/96.15 |
| 4,864,312 | 9/1989 | Huignard et al. | 342/375 |

*Primary Examiner*—Frank Gonzalez
*Attorney, Agent, or Firm*—William Stepanishen; Donald J. Singer

[57] ABSTRACT

A partitioned optical delay line apparatus for time-steering large array antenna converting microwave signals to optical signals which are optically delayed in binary programmable fiberoptic delay lines to provide a number of output signal delay sets.

8 Claims, 2 Drawing Sheets

PARTITIONED OPTICAL DELAY LINE ARCHITECTURE FOR TIME STEERING OF LARGE 1-D ARRAY ANTENNAS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to an optical delay line apparatus and, more particularly, to a partioned optical delay line apparatus for time steering of large one-dimensional array antennas.

The state of the art of optical delay line apparatus is well represented and alleviated to some degree by the prior art apparatus and approaches which are contained in the following U.S. Patents:

U.S. Pat. No. 3,368,202 issued to Crousel on Feb. 6, 1968;
U.S. Pat. No. 4,671,604 issued to Soref on June 9, 1987;
U.S. Pat. No. 4,671,605 issued to Soref on June 9, 1987;
U.S. Pat. No. 4,714,314 issued to Yang et al on Dec. 22, 1987;
U.S. Pat. No. 4,725,844 issued to Goodwin et al on Feb. 16, 1988;
U.S. Pat. No. 4,814,773 issued to Wechsberg et al on Mar. 21, 1989;
U.S. Pat. No. 4,814,774 issued to Herczfeld on Mar. 21, 1989; and
U.S. Pat. No. 4,832,433 issued to de La Chapelle et al. on May 23, 1989.

The Crousel patent is directed to a memory core matrix and simple delay means like magnetic drum apparatus or sonic delay lines in place of the complicated interconnection network, summation equipment and shift registers which are employed in a multibeam receiving system.

The Soref patent (604) describes a wavelength dependent, tunable, optical time delay system for electrical signals having a conversion/tuning unit for converting an incoming electrical signal into an optical signal as well as selectively varying the wavelength of the optical signal. By selectively varying the wavelength of the optical signal, the electrical signal can effectively and rapidly time delayed as desired in response to the electronic signal.

The Soref patent (605) is directed to a length dependent, optical time delay/filter device for electrical signals made up of a plurality of optical fibers of varying lengths. Depending upon which fibers an optical signal (converted from an incoming electrical signal) passes through determines the time of travel of the optical signal through the device, and as a result thereof is time delayed.

The Yang et al patent discloses a mode dependent, optical time delay system for electrical signals having a highly multi-mode optical fiber having a step index profile in optical alignment with an optical source which is capable of converting an incoming electrical signal into an optical signal.

The Goodwin et al patent discusses a technique for applying selected phase delays to an optical carrier signal, the phase delays being referenced to a radio-frequency (rf) subcarrier signal. The optical signal to be phase delayed is introduced into a phase delay network comprising multiple optical paths and multiple electro-optical switches, controllable by signals generated in switching logic. The selected delays can be introduced for purposes of data modulation, or for steering an antenna beam in a phased-array antenna.

The Wechsberg et al patent describes a fiber optic feed network for a radar which couples the antenna with the transmitting and receiving circuitry. The feed system includes a set of optical multiplexers interconnected by sets of optical fibers. Microwave energy of the radar is converted to optical radiation for communication to the antenna, and then converted back to the microwave energy.

The Herczfeld patent discloses an optically controlled phased array antenna system and method of operating same utilizing fiber optic transmission lengths and controlled piezo-electric crystals or equivalent elements to introduce predetermined time delays into each light signal by controlling the respective length of each fiber optic link. The light carrying fibers are wrapped around the respective crystals in accordance with a pattern to introduce time delays corresponding to the amount of stretch given to the fiber by the energized crystals. Beam scanning is achieved by controlling the matrix of crystals to introduce appropriate time delays into the optical signals which drive the respective antenna elements.

The de La Chapelle et al patent is directed to a fiber-optic feed network using series/parallel connected light emitting optic-electronic components, such as laser diodes for distributing RF, microwave, MMW, digital signals, and pulse modulated light. The diodes are selected in number and impedance to provide a good wideband impedance match to the RF/microwave/MMW/digital driving source.

In a K-element 1-D array antenna with element to element spacing of $\lambda/2$, the time delay $T_k$ required by the kth element for antenna pointing at angle $\theta$ with respect to boresight is given by $$T_k = k\lambda \sin\theta / 2c \qquad (1.1)$$

The total number $R$ of different delays required for steering the antenna over a total angle $\theta_M$ with resolution $\theta_o$, is equal to $$R = \theta_M / \theta_o \qquad (1.2)$$

Typical R values are of the order of several thousands. An efficient fiberoptic delay line architecture that can easily handle this large number of delays and thus addressing each element, is the binary programmable fiberoptic delay line (BIFODEL). In the BIFODEL the microwave signal to be delayed, is converted to an optical signal via the use of a laser diode and is then routed through M fiber segments, where $M = \log_2(R)$. Each fiber segment has a length that is equal to twice the length of its right neighbor. The length of the smallest segment is such that the delay introduced corresponds to the desired delay resolution $T_{min}$. Selection of the fiber segments, through which the signal is routed, can be achieved via the use of M 2×2 optical switches, each of which allows the signal to enter or to bypass a specific fiber segment. After the signal has been routed through the proper fiber segments, it is detected and subsequently buffered and further processed. The importance of the BIFODEL comes because the total number of delays that can be generated is equal to $2^M$, and thus with a small number of fiber segments a very large number of delays can be generated, e.g., for $M=12$ we have up to 4,096 possible delays. A BIFODEL prototype with $M=8$ and passband in the 500–1000 MHz band has been demonstrated in the R&D Center.

Equation 1 shows that the delay and the delay resolution $T_{min}$ of the BIFODEL are different for each element, and this implies that a different BIFODEL is required for each array element. This situation is impractical because it results in a large amount of hardware since current and future 1- and 2-D antenna arrays with several thousand elements are rather typical, which implies that several thousand different BIFODELs would be required. Note that a far worse situation would be faced with 2-D antennas as well, with the hardware complexity requirement being proportional to $K^2$, where $K \times K$ are the array dimensions.

Efficient delay line architectures that can handle the above problems without requiring K different BIFODELs do not exist, at least in the open literature. In this disclosure there is presented a new, very powerful technique that is appropriate for large array antennas ($>1,000$), and when used in conjunction with either of the disclosed architectures or even simple BIFODELs it realizes very large hardware savings ($>92$ percent).

While the above-cited references are instructive, there still remains a need to provide a partitioned optical delay line apparatus for time steering of very large one-dimension array antennas. The present invention is intended to satisfy that need.

SUMMARY OF THE INVENTION

The present invention utilizes a partitioned optical delay line apparatus which is capable of time steering very large (i.e. $>1000$ elements) one-dimensional array antennas. The apparatus provides for the generation of multiple beams with savings in hardware greater than 92 percent of prior art devices.

The total number of different delays required for steering an antenna over a total angle $$R = \theta_M/\theta_O$$

are typically in the order of several thousands. An efficient fiberoptic delay line device which can handle this large number of delay and thus address each element is the binary programmable fiberoptic delay line (BIFODEL). The (BIFODEL) delays the microwave signal and linearly modulates the intensity of a laser diode. The optical signal produced is then routed through fiber segments which each have different lengths and thus provide a variety of delay s elections that can be utilized to provide an overall delay corresponding to the desired delay resolution.

It is one object of the present invention, therefore, to provide an improved partitioned optical delay line apparatus.

It is another object of the invention to provide an improved partitioned optical delay line apparatus that can time-steer numerically large one-dimensional array antennas.

It is still another object of the invention to provide an improved partitioned optical delay line apparatus wherein the total number of different delays that are required for steering an antenna over a wide angle is generated by a programmable fiberoptic delay line.

It is yet another object of the invention to provide an improved partitioned optical delay line apparatus wherein the output signals from the fiberoptic delay line comprise a plurality of sets of output delay signals.

It is still a further object of the invention to provide an improved partitioned optical delay line apparatus wherein a very large number of delays can be generated with a small number of optic fiber segments.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Consider partition the K elements of an 1-D array into E sets of N elements each, such that $K=NE$, in which $N<<K$, e.g., for $K=1000$, $N=64$. Using the indices $j=1, 2, 3, \ldots, E$, and $i=1, 2, 3, \ldots, N$ for representing the set and element address respectively, we can translate $T_k$ into $T_{ji}$ using to the following relations:

$$j = [k-1/N] + 1 \quad (2.1)$$

$$i = k - (j-1)N \quad (2.2)$$

where $[k-1/N]$ denotes the integer value of the quotient $k-1/N$. Note that Equation 2.2 can be used in order to translate $T_{ji}$ into $T_k$. Hereafter the 1st or $j=1$ element set will be called the "reference" set, and will denote its N delays $T_{1i}$, ($i=1, 2, \ldots, N$) by $T_i$ ($i=1, 2, \ldots, N$). It should be noted that each of these N delays may take up to R different values.

It is possible to design an efficient partitioned delay line architecture if the delays required by any set are basically the delays of the reference set added to a bias delay which is the same for each set, however, it varies from set to set. To see this consider applying Equation 2.2 for the description of the delay $T_{ji} = T_k$, which becomes:

$$T_{ji} = T_i + (j-1)T_N \quad (2.3)$$

where $T_N$ is the delay of the Nth element of the reference set. Equation 2.3 shows that the delay required by the ith element of the jth set is equal to the delay of the ith element of the reference set plus a bias delay which is equal to $j-1$ times the delay of the Nth element of the reference set. Observe that the bias term depends only on j and not on i, and thus it is common to all the elements of a given set. This implies that the hardware requirements for addressing the N elements of the jth set consist of an N-channel delay line (appropriate for addressing the reference set) cascaded to a single bias delay line. The latter must be able to provide R different bias delays with delay resolution of $j-1)T_{Nmin}$, where $T_{Nmin}$ is the delay resolution of the Nth element of the reference set.

Figure 1:
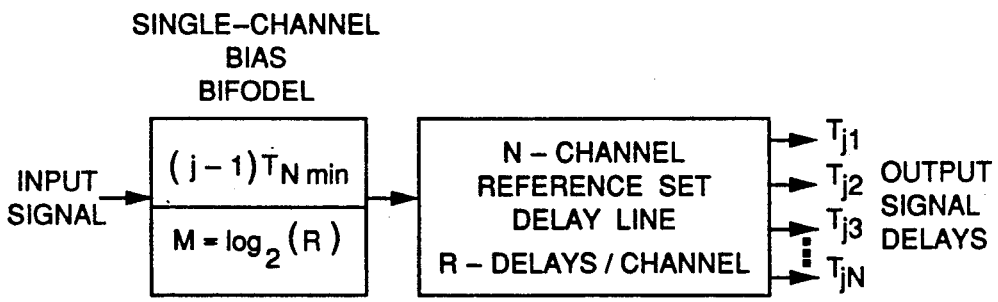
FIG. 1 is a block diagram of a delay line for generating delays of the jth set.

Referring now ti FIG. 1, there is shown a block diagram of a BIFODEL-based implementation example for addressing the N elements of the jth set. In FIG. 1, the data in the upper part of the block used for representing the BIFODEL (binary programmable fiberoptic delay line) denotes the delay resolution or minimum delay BIFODEL requirement. The lower part of the block denotes the number of BIFODEL delay stages. It is important to realize that since $N < < K$, the N-channel reference set delay line could be implemented by using either a recirculating delay line apparatus or by a cascaded BIFODEL apparatus.

Figure 2:
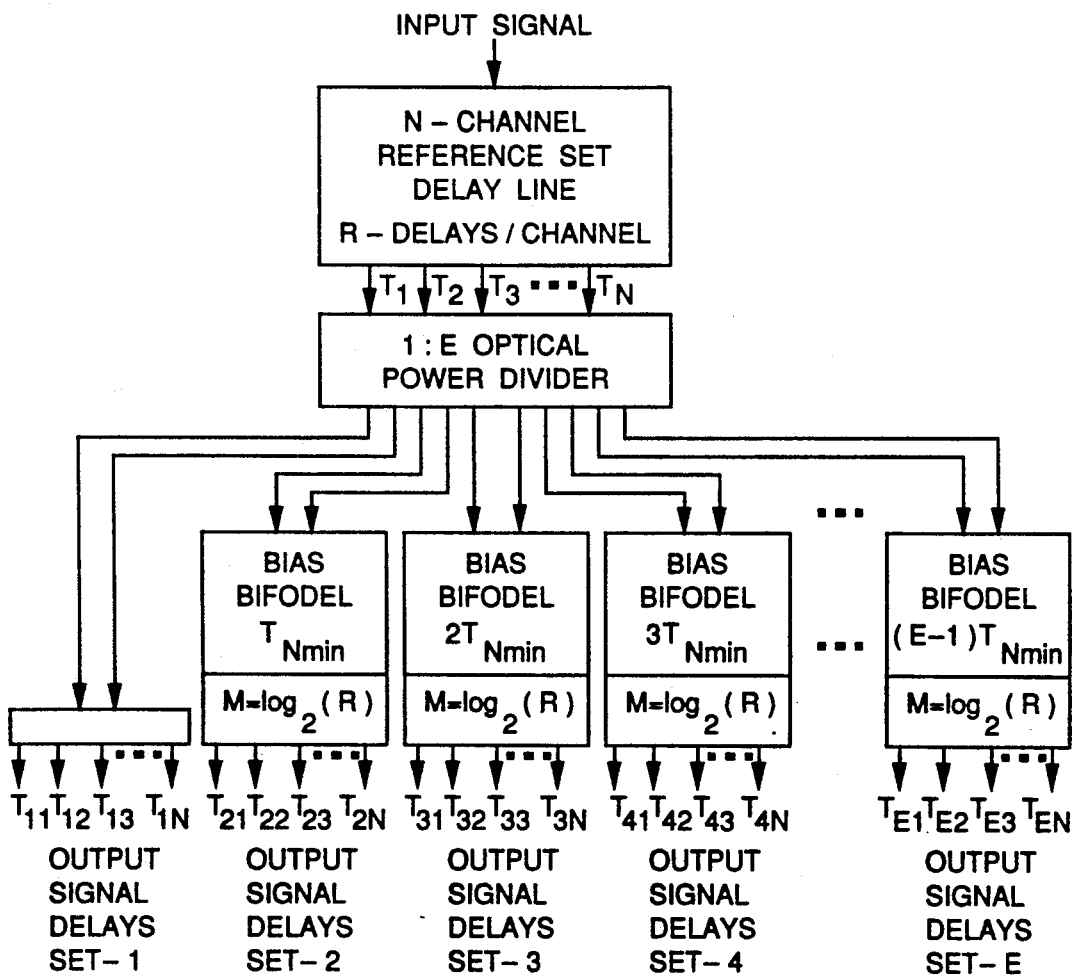
FIG. 2 is a block diagram of a partitioned delay line apparatus according to the present invention.

From the above it should be obvious that the same N-channel reference delay line is required by each element set. This implies that the same N-channel reference delay line can be used for all the E element sets in conjunction with power division. This technique is the basis of the partitioned delay line apparatus. Turning now to FIG. 2, there is shown a block diagram of a partitioned delay line apparatus. It may be seen that one N-channel reference delay line and E bias binary programmable fiberoptic delay line units are used in order to address all the $K = NE$ elements of the array antenna. It is important to note that for the implementation of FIG. 2, all the bias binary programmable fiberoptic delay line units are optical, that is, they accept an optical input (such as the output provided by the reference delay line), and they should be able to support the optical bandwidth of the reference delay line which provide each of the N delayed signals on a different optical wavelength. Furthermore, an optical demultiplexer (DEMUX) is required at the output of each bias binary programmable fiberoptic delay line unit in order to separate the N progressively delayed signals each of which is carried by a different optical wavelength.

The total number of binary programmable fiberoptic delay line units required for the implementation of the architecture of FIG. 2 when the reference N-channel delay line is implemented with recirculating ($C_R$) or cascaded ($C_C$) BIFODELs is equal to $$CR = E \tag{2.4}$$

$$C_C \log_2(N) + E - 1 \tag{2.5}$$

where in both cases the number of bias binary programmable fiberoptic delay line units is equal to $E-1$. In both cases and for all binary programmable fiberoptic delay line units the number of delay M is equal to $\log_2 R$. It is important to note that the presence of a separate bias binary programmable fiberoptic delay line unit per element set allows us to steer each set differently, and thus up to E different output beams may be generated.

Figure 3:
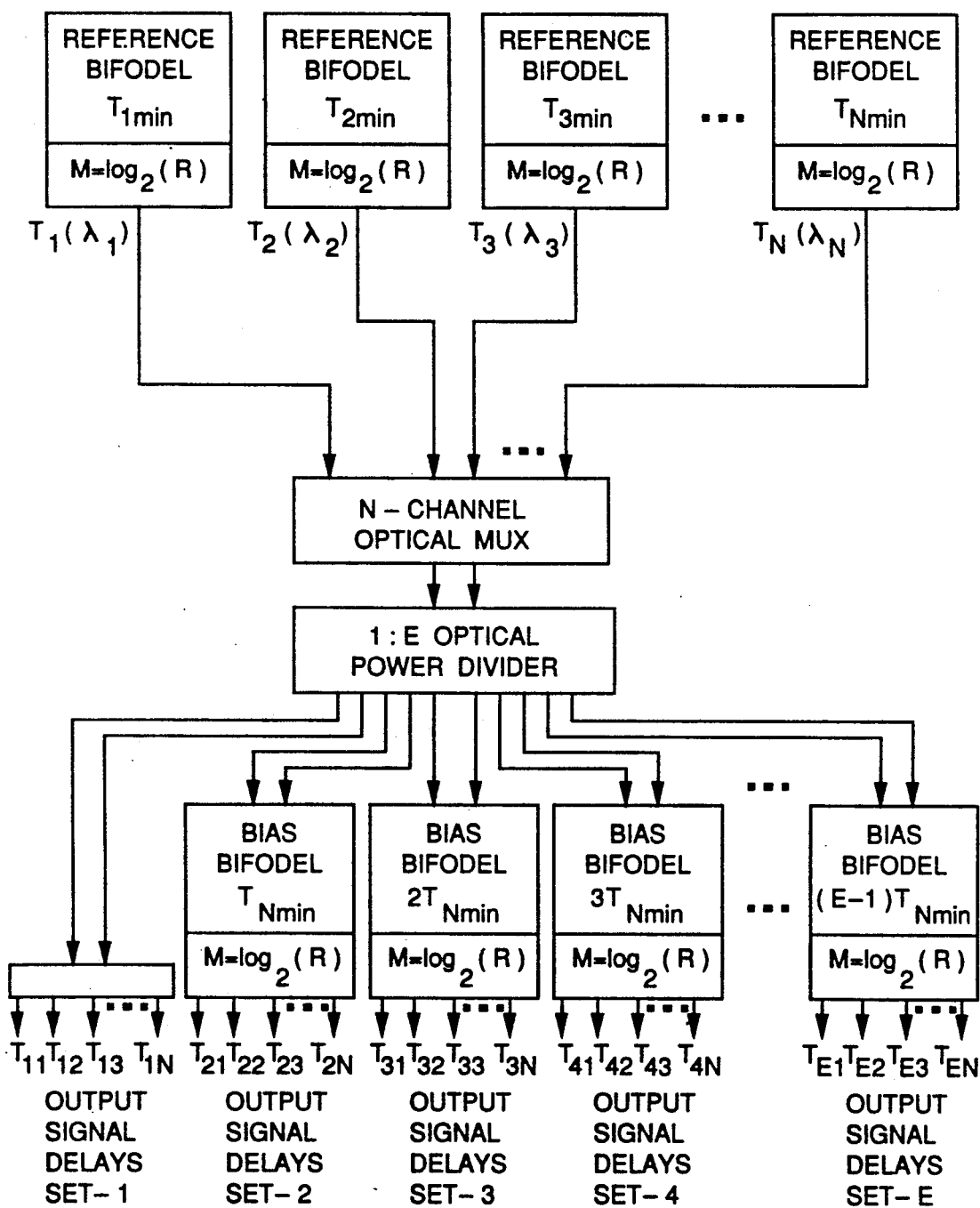
FIG. 3 is a block diagram of a partitioned binary programmable fiberoptic delay line apparatus for steering an NXE element one-dimensional antenna array.

It should be noted that in an alternative configuration, the N-channel reference delay line in the architecture of FIG. 2 can be substituted with N binary programmable fiberoptic delay line units each of which operates at a different optical wavelength. This circuit configuration is shown in FIG. 3 in which N reference binary programmable fiberoptic delay line units with outputs at wavelengths $\lambda_1, \lambda_2, \ldots, \lambda_N$ are optically multiplexed (MUX) and consequently power divided into E channels, each of which drives a bias binary programmable fiberoptic delay line unit. Each reference binary programmable fiberoptic delay line unit has a delay resolution that is equal to the delay resolution of the element to which it corresponds. For both the reference and the bias binary programmable fiberoptic delay line units the number of stages M is equal to $\log_2(R)$. The requirements for the bias binary programmable fiberoptic delay line units are the same as for those in the circuit configuration that is shown in FIG. 2. These requirements are that the binary programmable fiberoptic delay line units must be optical with a bandwidth that supports all N optical wavelengths, and they must incorporate an optical DEMUX at their output. For this circuit configuration, the total number $C_B$ of binary programmable fiberoptic delay line units that are required is equal to $$C_B = N + E - 1 \tag{2.6}$$

Equations 2.4, 2.5 and 2.6 demonstrate the circuit configurations of FIGS. 2 and 3 do achieve every significant delay line savings since neither of the $C_R$, $C_C$, and $C_B$ are proportional to the product of NE which is the case of the straightforward implementation. In order to compare the hardware requirements of the various circuit configurations, a calculation has been made for $C_R$, $C_C$ and $C_B$ for the case of $K = 1000$ and for N values of 8, 16, 32 and 64. The results are shown in Table 1.

TABLE 1

BIFODEL Hardare Requirements and Savings for K = 1000 When the N-Channel Reference Delay Line is Implemented with a Recirculating ($C_R$), Cascaded ($C_C$) and Separate BIFODEL ($C_B$) Delay Lines

| | Recirculating | | Cascaded | | Separate-BIFODEL | |
|---|---|---|---|---|---|---|
| N | $C_R$ | Savings Percentage | $C_C$ | Savings Percentage | $C_B$ | Savings Percentage |
| 8 | 125 | 87.5 | 127 | 87.3 | 132 | 86.8 |
| 16 | 63 | 93.7 | 66 | 93.4 | 78 | 92.2 |
| 32 | 32 | 96.8 | 36 | 96.4 | 63 | 93.7 |
| 64 | 16 | 98.4 | 21 | 97.9 | 79 | 92.1 |

It should be noted that a straightforward binary programmable fiberoptic delay line unit implementation would require 1,000 different binary programmable fiberoptic delay line units. It can be seen that, as the above data show, for partitions with $N \geq 16$ all three approaches achieve very significant hardware savings which exceed 92 percent. It may further be noted that the use of recirculating and cascaded binary programmable fiberoptic delay line units achieve basically the same amount of savings which is slightly better than the savings possible with the separate binary programmable fiberoptic delay line unit approach. With respect to the latter achitecture, there is an optimum partition which yields the maximum possible savings, and is:

$$N = E = K \tag{2.7}$$

The present invention discloses a very powerful partitioned delay line circuit configuration that can be implemented with a variety of binary fiberoptic delay line configurations. This architecture can time steer array antennas with several thousand elements, and yields hardware savings of over 92 percent with respect to that required by a straightforward implementation.

Although the invention has been described with reference to a particular embodiment, it will be understood to those skilled in the art that the invention is capable of a variety of alternative embodiments within the spirit and scope of the appended claims:

What is claimed is:

1. A partitioned optical delay line apparatus for time steering of large array antennas comprising in combination:

means for converting a microwave signal to an optical signal, said converting means receiving and converting said microwave signal to an optical signal, means for delaying optical signals, said optical delay means receiving and delaying said optical signal to provide a plurality of delay signals, each on a different optical wavelength.

a power divider means receiving and dividing said plurality of delayed signals into a plurality of input signals, and, a plurality of bias delay lines respectively receiving a group of input signals of said plurality of input signals, the number of said plurality of bias delay lines corresponding to the number of elements in said array antenna, each bias delay line of said plurality of bias delay lines has a delay resolution which corresponds to its respective element, each bias delay line delaying its respective group of input signals to respectively provide an output signal delay set.

2. A partitioned optical delay line apparatus as described in claim 1 further including a multi-channel optical multiplexer, said optical multiplexer receiving said plurality of delay signals and providing a multiplexed output signal to said power divider means.

3. A partitioned optical delay line apparatus as described in claim 1 wherein said power divider means comprises an optical power divider.

4. A partitioned optical delay line apparatus as described in claim 1 wherein said converting means comprises a laser diode to convert said microwave signal to an optical signal.

5. A partitioned optical delay line apparatus as described in claim 1 wherein said optical delay means comprises a binary programmable fiberoptic delay line.

6. A partitioned optical delay line apparatus as described in claim 1 wherein each bias delay line of said plurality of bias delay lines comprises a binary programmable fiberoptic delay line.

7. A partitioned optical delay line apparatus as described in claim 5 wherein said binary programmable fiberoptic delay line utilizes a plurality of fiber segments to provide signal delay, each fiber segment of said plurality of fiber segment has a length that is equal to twice the length of its right neighbor.

8. A partitioned optical delay line apparatus as described in claim 6 wherein said binary programmable fiberoptic delay line utilizes a plurality of fiber segments to provide signal delay, each fiber segment of said plurality of fiber segment has a length that is equal to twice the length of its right neighbor.

* * * * *